United States Patent [19]

Ota

[11] Patent Number: 4,821,406

[45] Date of Patent: Apr. 18, 1989

[54] PROCESS FOR PRODUCING A MAGNETIC HEAD

[75] Inventor: Hiroyuki Ota, Saitama, Japan

[73] Assignee: Pioneer Electronic Corporation, Tokyo, Japan

[21] Appl. No.: 160,969

[22] Filed: Feb. 26, 1988

[30] Foreign Application Priority Data

Feb. 27, 1987 [JP] Japan .................................. 62-43153

[51] Int. Cl.$^4$ ............................................ G11B 5/412
[52] U.S. Cl. ........................................ 29/603; 360/120
[58] Field of Search .................. 29/603; 360/119, 120, 360/125–127

[56] References Cited

U.S. PATENT DOCUMENTS

| 3,479,738 | 11/1969 | Hanak ................................... 29/603 |
| 4,679,898 | 9/1988 | Ono et al. ............................. 29/603 |
| 4,704,788 | 11/1987 | Eckstein ................................ 29/603 |

Primary Examiner—Carl E. Hall
Attorney, Agent, or Firm—Sughrue, Mion, Zinn, Macpeak and Seas

[57] ABSTRACT

A process for producing a magnetic head having improved registry between opposite track width controlling grooves. A magnetic gap forming nonmagnetic thin film is deposited on a first magnetic oxide substrate made of a magnetic oxide material, and a thin magnetic metal film is formed over the nonmagnetic thin film. Recording/reproducing track width controlling grooves are formed in the surface of the magnetic oxide substrate, thereby providing a first core half. On a second magnetic oxide substrate is formed a magnetic thin film for provide a second core half. The two core halves are joined to produce a head block by joining the two magnetic thin metal film coatings. The head block is then sliced to form discrete magnetic heads.

7 Claims, 4 Drawing Sheets

PROCESS FOR PRODUCING A MAGNETIC HEAD

BACKGROUND OF THE INVENTION

The present invention relates to an improved process for producing a magnetic head of a type used in a video tape recorder, digital audio tape recorder or the like and mounted at a selected location on the periphery of a rotated drum with which magnetic tape makes helical contact for achieving helical-scan inclined-azimuth recording.

Recent technological advances toward higher packing densities in magnetic recording have been remarkable. This has caused a growing need to reduce the track width produced by magnetic heads in both recording and playback modes, as well as the width of the magnetic gap. Taking 8 mm video cameras and digital audio tape recorders as examples, the magnetic head produces a track width of as small as about 10 microns and a gap width of 0.2 to 0.3 microns.

The magnetic gap of such a head and its nearby area are shown enlarged in FIG. 1. Shown by 1a and 1b are core halves that combine together to form a magnetic circuit in the head, 2 is a glass material that is filled in track width controlling grooves formed in the mating surfaces of core halves 1a and 1b and which serves to join the two core halves together, and 3 is nonmagnetic thin film that forms a magnetic gap, or a working gap, between the core halves 1a and 1b.

Magnetic heads having such a construction are mounted at two or more locations on the periphery of a cylindrical drum which is rotated as magnetic tape makes helical contact with the drum, thereby achieving helical recording and reproduction on the tape.

In helical-scan inclined-azimuth recording of the type described above, two or more magnetic heads having different azimuthal angles are employed, and the track width of each head is set at a value slightly larger than the pitch of adjacent tracks formed on the tape. As shown in FIG. 2, as the tape is driven across the rotating drum, the two magnetic heads record information at different azimuthal angles, one head producing a recording pattern 6a and the other head producing a pattern 6b. This is described below more specifically with respect to the recording mode (FIG. 3) and the playback mode (FIG. 4). In FIG. 3 an arrow A indicates the direction of tape transport and an arrow B designates the direction in which the head rotates. Of the two magnetic heads, the first head produces a recording pattern 16a at a first azimuthal angle. Since the tape is running during the production of pattern 16a, the second magnetic head touches an area of the tape that overlaps the pattern 16a so as to erase part of the latter, thereby producing a recording pattern 16b that overlaps the pattern 16a but which has a different azimuthal angle. The recording patterns produced by scanning with the first and second heads in the manner described above are designated by 6a and 6b in FIG. 2.

In the playback mode (FIG. 4), the first head having a track width C, which is greater than the width of the track recorded on the magnetic tape, scans the tape in such a way that it bridges adjacent tracks recorded by the second head. Since the two magnetic heads have different azimuthal angles, no information is reproduced from the tracks recorded by the second head and only the tracks recorded by the first head are reproduced.

A magnetic head used to perform such recording/reproducing functions is shown diagrammatically in FIG. 5. In order to fabricate such a magnetic head, core halves 1a an 1b are machined to form a plurality of track width controlling grooves spaced apart by a distance corresponding to the track width. Thereafter, a magnetic-gap-forming nonmagnetic thin film is deposited on the mating surfaces of the core halves, which are joined together in such a way that the opposite track width controlling grooves are in registry with each other. A glass material 2 is then filled in each groove and the core halves 1a and 1b are bonded together to form a single core block. The block is sliced into discrete magnetic heads by cutting along lines spaced apart by a distance equivalent to the width indicated by 5 in FIG. 5. The gap and the nearby area of one of such individual magnetic heads is shown enlarged in FIG. 1.

Fabrication of a magnetic head as illustrated in FIG. 5 has the problem that it is very difficult to achieve complete registry between opposite track width controlling grooves and misalignment often occurs in the magnetic heads produced by slicing the core block as illustrated in FIG. 1. In this situation, the width of the magnetic gap that is effectively used for recording and playback purposes is limited to the area indicated by 4 in FIG. 1. Such misalignment presents a serious problem in a magnetic head having a small track of only about 10 microns. In order to avoid such problems, very close tolerances are required in machining and joining the block halves 1a and 1b.

One approach that has been taken to prevent the occurrence of misalignment between opposite grooves formed in the two core halves 1a and 1b is to cut the groove in such a way that the magnetic gap defined by the grooves cut in the core half 1a has a different width from the gap defined by the grooves cut in the other core half 1b. The core halves so worked are subsequently joined together. The track width of the magnetic head fabricated by this method is defined by the narrower gap in the core half 1a.

However, the following problem occurs if this magnetic head is used in helical-scan inclined-azimuth recording. As already explained with reference to FIGS. 2 and 3, information is overwritten on the magnetic tape so as to produce a track width greater than the pitch of adjacent tracks on the tape. In this case, however, the edge of the individual recorded tracks is determined by the end of the magnetic head gap from which magnetic flux leaks. In the case of the magnetic gap shown in FIG. 6, the magnetic field produced by this leakage flux is small and each of the tracks formed on the magnetic tape will produce a sharp magnetic end, producing recording patterns as shown in FIG. 2. On the other hand, if recording is made with a magnetic head as shown in FIG. 7, a large flux leaks from the end of the magnetic gap to produce an increased leakage magnetic field. As a result, the magnetic gap end becomes indistinct and extends beyond the mechanical gap end to cause undesired recording effect.

In addition, the region 7 that determines recording magnetization in the vicinity of the gap becomes curved as shown in FIG. 8 and the recorded track pattern has the relationship shown in FIG. 9 with respect to the magnetic head depicted in FIG. 10. FIG. 10 shows the track pattern produced by this magnetic head. Reference numeral 8 in Fig. 11 indicates the area where information is recorded at an azimuthal angle different from that of the magnetic head used to achieve this recording. This area effectively reduces the track width of the playback head, thereby reducing the reproduction output. This area, which does not contribute to the reproduction output, is a significant factor in 8 mm video cameras and audio digital tape recorders which have a small track width. Thus, the reproduction output is inevitably somewhat reduced.

SUMMARY OF THE INVENTION

The present invention has been accomplished in order to solve the aforementioned problems of the prior art magnetic heads. An object, therefore, of the present invention is to provide a process for fabricating a magnetic head at a low cost and with great ease by eliminating the need to perform machining and joining operations for track matching.

Basically, this is achieved with the invention by forming a magnetic gap in only in one of the two core halves, that is, with the other half not participating in the formation of a magnetic gap.

More specifically, in order to attain the above-stated object, a nonmagnetic thin film is formed on a magnetic oxide substrate and a thin magnetic metal film is formed on the nonmagnetic thin film. A plurality of track width controlling grooves are formed in the two thin films to produce a core half. The other core half, which has a thin magnetic metal film formed on a magnetic oxide substrate but which has no gap width controlling grooves formed in the thin magnetic metal film, is joined to the thin magnetic metal film formed on the first core half.

DESCRIPTION OF THE PREFERRED EMBODIMENTS

Preferred embodiments of the present invention will hereinafter be described with reference to FIGS. 12 through 16.

Figure 12:
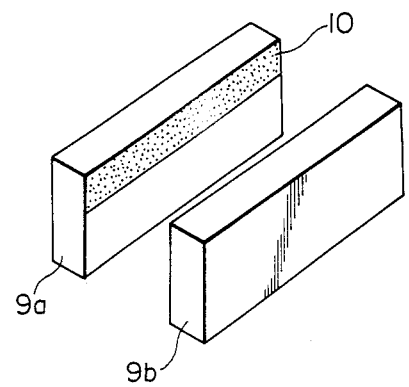
FIGS. 12 to 16 are perspective views showing process steps of magnetic head fabrication according to one embodiment of the present invention.

FIG. 12 shows two core halves 9a an 9b. The mating surfaces of these core halves are ground and polished to a specular finish. The upper part of the specular surface of one core half 9a is covered with a nonmagnetic thin film 10 that serves as a gap spacer and whose thickness is equal to the gap length.

Figure 13:
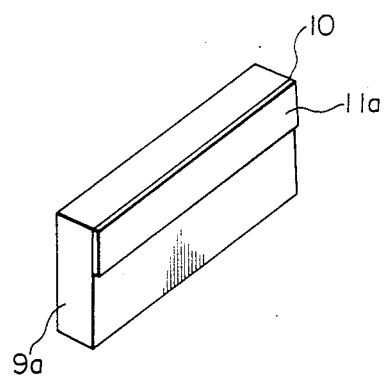

A thin magnetic metal film 11a is formed on the nonmagnetic film 10, as shown in FIG. 13, by suitable means such as sputtering or evaporation.

Figure 14:
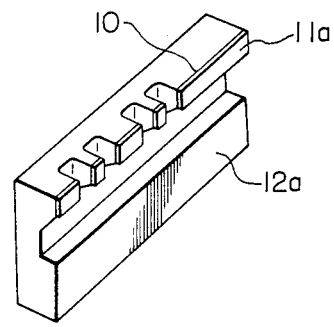

In the next step, as shown in FIG. 14, the core half 9a is provided with a groove for accommodating a coil winding and with a plurality of track width controlling grooves spaced along the coil accommodating groove and which penetrate through the thin magnetic metal film 11a and nonmagnetic thin film 10 into the core half 9a, thereby forming a block half 12a.

Figure 15:
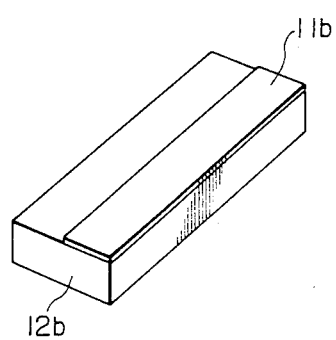

As shown in FIG. 15, a thin magnetic metal film 11b is formed on the specular surface of the other core half 9b by a suitable method such as sputtering or evaporation so as to produce a block half 12b.

Figure 16:
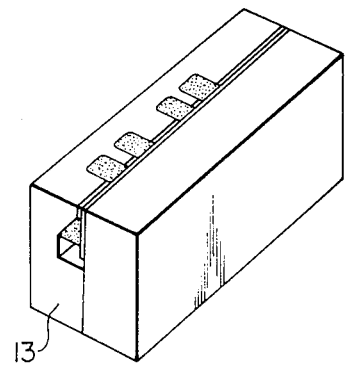

The two block halves 12a and 12b are brought into abutment with each other in such a way that the thin magnetic metal films 11a and 11b are in contact with each other. After filling the track width controlling grooves with a glass material, the two block halves are joined together to form a head block 13 as shown in FIG. 16.

This head block is sliced along lines spaced apart by a certain distance so as to obtain a plurality of discrete magnetic heads. The magnetic gap portion of one of these heads is shown enlarged in FIG. 17

The thin magnetic metal films 11a and 11b are desirably made of an alloy having a comparatively low hardness, such as Permalloy.

Figure 1:
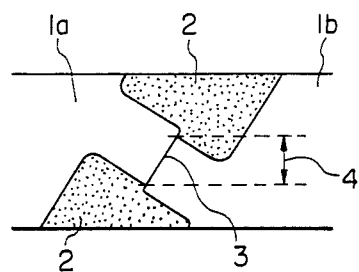
FIG. 1 is an enlarged plan view showing the situation where track mismatching occurs in the magnetic head shown in FIG. 6.
Figure 2:
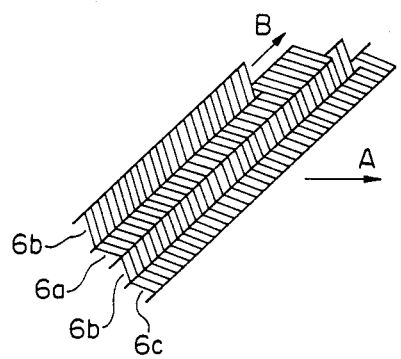
FIG. 2 shows a recording pattern produced on a magnetic tape by helical-scan inclined-azimuth recording.
Figure 3:
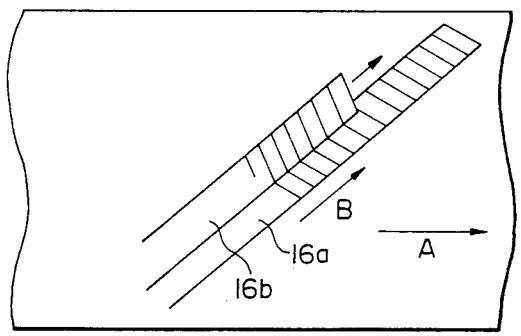
FIG. 3 shows the process of formation of a recording pattern on a magnetic tape in a recording mode.
Figure 4:
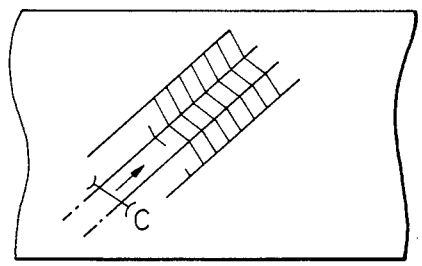
FIG. 4 illustrates a process of information reproduction from the pattern shown in FIG. 3.
Figure 5:
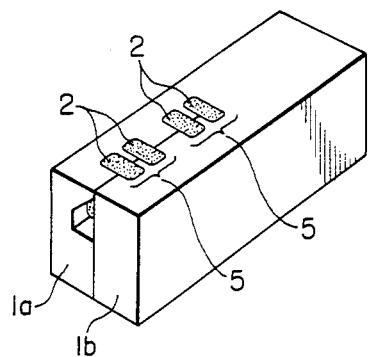
FIG. 5 is a perspective view showing a process step of the fabrication of the magnetic head illustrated in FIG. 6.
Figure 6:
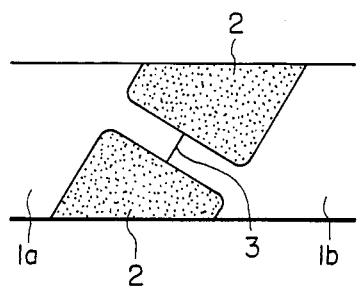
FIG. 6 is an enlarged plan view showing the magnetic gap portion of a prior art magnetic head.
Figure 7:
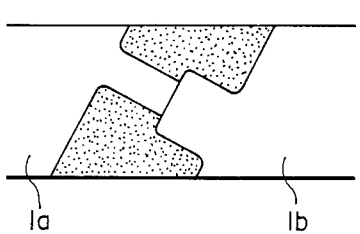
FIG. 7 is an enlarged plan view of the magnetic gap portion of a magnetic head which has different dimensions on opposite sides.
Figure 8:
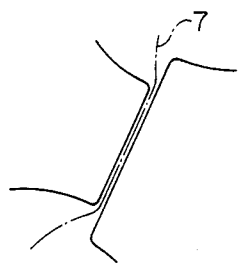
FIG. 8 shows a magnetization determining region in the magnetic gap shown in FIG. 7.
Figure 9:
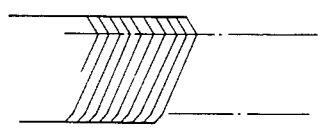
FIGS. 9 and 10 show the state of recording and the magnetic head, respectively, in association with FIG. 8.
Figure 10:
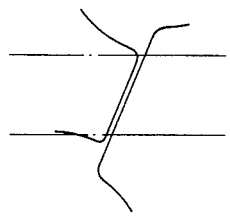
Figure 11:
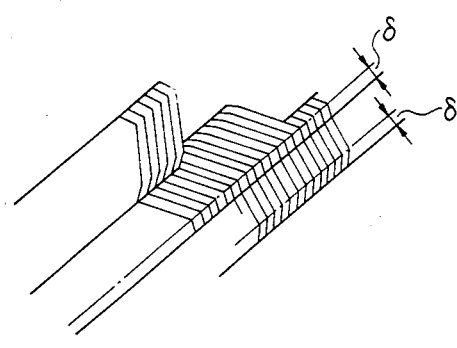
FIG. 11 shows the recording pattern formed on a magnetic tape by recording with a different azimuthal angle.
Figure 17:
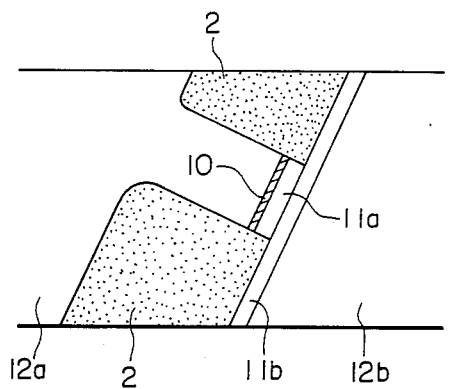
FIG. 17 is a enlarged plan view of the magnetic gap portion of the head produced by the process shown in FIGS. 12 to 16.

As shown in FIG. 17, the track width of the magnetic head fabricated by the process of the present invention is determined by the distance between adjacent track width controlling grooves formed in the block half 12a. In addition, both sides of the magnetic gap are defined by the adjacent track width controlling grooves which were cut simultaneously so that will be no misalignment or dimensional mismatch occurring between the two sides of the magnetic gap. Hence, the magnetic gap formed in the head having the configuration shown in FIGS. 6 or 7 is free from the problems described in association with the prior art magnetic heads.

A gap may form between the thin magnetic metal film 11a on the block half 12a and the thin magnetic metal film 11b on the other block half 12b. However, in the absence of any gap spacer between the two magnetic metal films 11a and 11b, the grinding and polishing action used to provide a cylindrical surface on the head that is to be in sliding contact with magnetic tape or the abrasive action of the tape provides a sufficient effect to fill any gap that might form between these two thin films. Therefore, there is no possibility of a magnetic gap forming between the thin magnetic metal films 11a and 11b. Another reason for this effect is that the films 11a and 11b, which are made of a low-hardness magnetic material such as Permalloy, can be readily bonded with pressure.

Other embodiments of the present invention will hereinafter be described with reference to FIGS. 18 through 20 that show at an enlarged scale the vicinity of the magnetic head gap.

Figure 18:
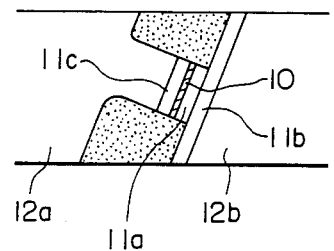
FIGS. 18 to 20 are enlarged plan views of the magnetic gap portions of the heads produced according to preferred embodiments of the present invention.

The magnetic head shown in FIG. 18 differs from the head shown in FIG. 17 in that the formation of the nonmagnetic thin film 10 shown in FIG. 12 is preceded by the formation of a thin magnetic film 11c. Magnetic heads can easily be magnetically saturated in the vicinity of the magnetic gap, and the magnetic saturation density of magnetic oxide materials is generally lower than that of metallic magnetic materials. Therefore, the composition shown in FIG. 18 is advantageous over that of FIG. 17 in terms of magnetic saturation.

Figure 19:
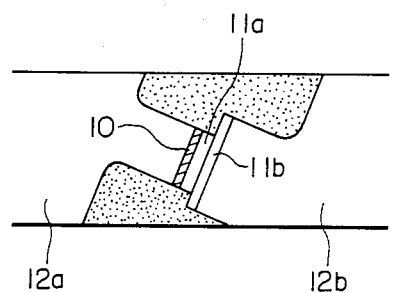

The magnetic head shown in FIG. 19 differs from the head of the first embodiment in that the block half 12b is provided with a plurality of track width controlling grooves that are narrower than those formed in the block half 12a.

Figure 20:
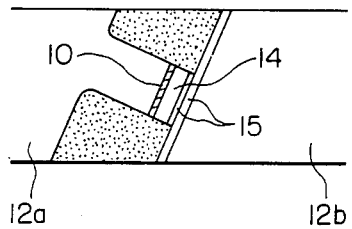

The magnetic head shown in FIG. 20 differs from the first embodiment in that the thin magnetic metal film 11a is formed of two layers, i.e., a layer 14 made of a hard magnetic metal with a Vickers hardness of more than about 500, such as a Sendust alloy, an a layer 15 made of a less hard magnetic metal with a Vickers hardness of less than about 200, such as Permalloy. In the embodiment shown in FIG. 20, the thin magnetic metal film 11b is formed of a magnetic metal such as Permalloy which is as soft as the metal of which the film 15 is made.

The magnetic head of the embodiment shown in FIG. 20 has the advantage that the thin magnetic metal film 14 sufficiently reduces the wear of the magnetic gap portion to ensure improved reliability, whereas the two soft metal films 15 effectively work to prevent the formation of a gap between them. The films 15 are capable of attaining this purpose even if their thickness is very small.

In accordance with the present invention, both nonmagnetic thin film and a magnetic thin metal film are formed on one of the two core halves, and a plurality of track width controlling grooves are cut in these thin films so as to form a magnetic gap, as well as a magnetic portion on both sides of the gap. This is effective in preventing the occurrence of misalignment or dimensional mismatch between the opposing magnetic portions of the magnetic gap, thereby avoiding the various problems that have plagued information recording on magnetic tape by the conventional magnetic heads.

A thin magnetic metal film is also formed on the other core half, and the two core halves are joined together with the respective thin magnetic metal films being brought into abutment against each other. The core halves being joined together in this way, no magnetic gap will form in the area where the two magnetic thin metal films are brought into abutment against each other.

The process of the present invention is easy to implement, involving no particular difficulty in avoiding the production of defective products having misalignment or dimensional mismatch between the two opposite sides of the magnetic gap portion. Because of this improved product yield, magnetic heads having a high performance can be produced economically in large quantities.

What is claimed is:

1. A process for producing a magnetic head, comprising the steps of: forming a magnetic-gap-forming nonmagnetic thin film on a first substrate made of a magnetic oxide material, forming a thin magnetic metal film on said nonmagnetic thin film, forming a plurality of recording/reproducing track width controlling grooves in a surface of said first substrate having said nonmagnetic thin film coating so as to produce a first core half, forming a thin magnetic metal film on a second substrate made of a magnetic oxide material so as to produce a second core half, and joining the two magnetic thin metal film coatings together on said first and second core halves to form a head block having a magnetic gap defined by said nonmagnetic thin film.

2. The process for producing a magnetic head of claim 1, further comprising the step of forming a coil accommodating groove in said first substrate.

3. The process for producing a magnetic head of claim 1, further comprising the step of filling said track width controlling grooves with a glass material before said step of joining said two magnetic thin film coatings.

4. The process for producing a magnetic head of claim 1, further comprising the step of slicing said head block to produce discrete magnetic heads.

5. The process for producing a magnetic head of claim 1, further comprising the step of, prior to said step of depositing said nonmagnetic thin film, forming a thin magnetic film on said first substrate.

6. The process for producing a magnetic head of claim 1, wherein said step of forming said thin magnetic metal film comprises: forming a layer of a hard magnetic material having a Vickers hardness of more than 500, and forming a layer of a less hard magnetic material having a Vickers hardness of less than 200.

7. A process for producing a magnetic head, comprising the steps of: forming a magnetic-gap-forming nonmagnetic thin film on a first substrate made of a magnetic oxide material, forming a thin magnetic metal film on said nonmagnetic thin film, forming a plurality of recording/reproducing track width controlling grooves in a surface of said first substrate having said nonmagnetic thin film coating so as to produce a first core half, forming a thin magnetic metal film on a second substrate made of a magnetic oxide material so as to produce a second core half, forming a plurality of track width controlling grooves in a surface of said second substrate having said thin magnetic metal film having a width less than a width of said track width controlling grooves in said first substrate and joining the two magnetic thin metal film coatings together on said first and second core halves to form a head block having a magnetic gap defined by said nonmagnetic thin film.

* * * * *